W. R. AMES.
Hog-Catching Implement.
No. 164,707. Patented June 22, 1875.
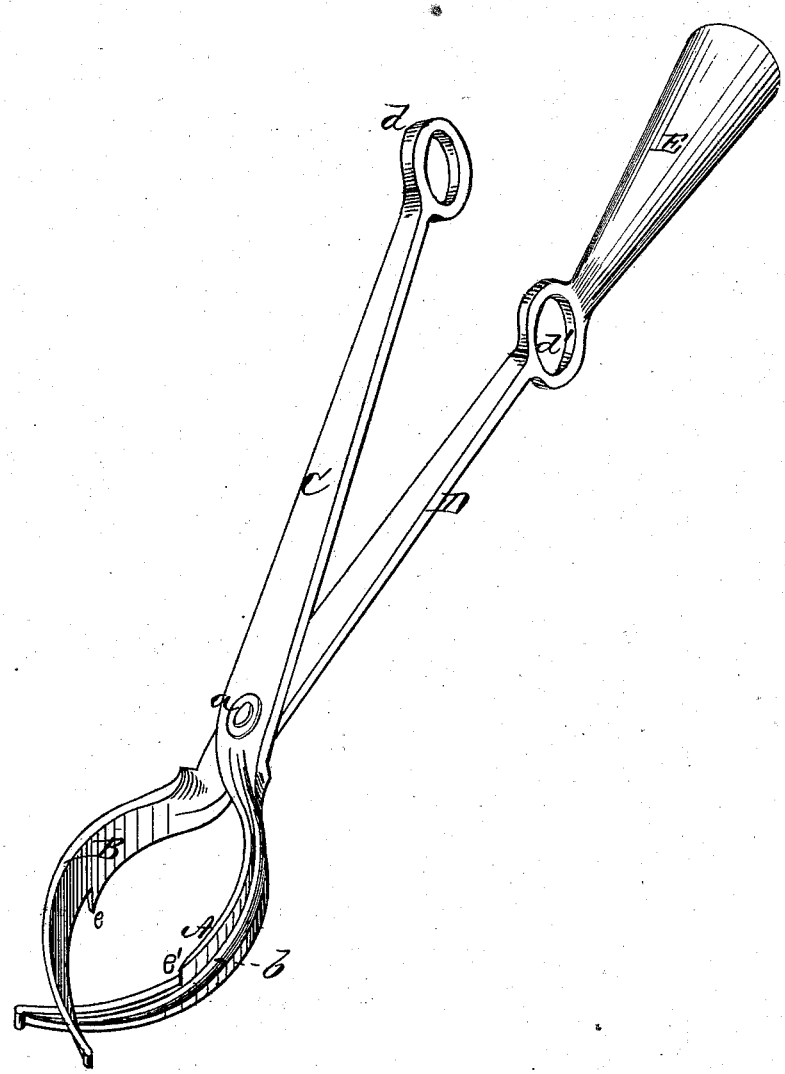
Witnesses.
G.a.C. Smith
C. L. Cuirk
Inventor.
William R. Ames
By J. Mc. Perkins
Attorney.

UNITED STATES PATENT OFFICE.

WILLIAM R. AMES, OF NEBRASKA CITY, NEBRASKA.

IMPROVEMENT IN HOG-CATCHING IMPLEMENTS.

Specification forming part of Letters Patent No. 164,707, dated June 22, 1875; application filed August 14, 1874.

*To all whom it may concern:*

Be it known that I, WILLIAM R. AMES, of Nebraska City, in the county of Otoe and State of Nebraska, have invented certain new and useful Improvements in Hog-Catchers; and I do hereby declare the following to be a full, clear, and exact description thereof, reference being had to the accompanying drawings and to the letters of reference marked thereon.

The nature of my invention consists in the construction and arrangement of a device for catching and holding hogs and other animals, as will be hereinafter more fully set forth.

In order to enable others skilled in the art to which my invention appertains to make and use the same, I will now proceed to describe its construction and operation, referring to the annexed drawing which forms a part of this specification, and which represents a perspective view of my invention.

A and B represent the two jaws, elliptical in shape, as shown, with handles C D, respectively. Each jaw, with its handle, is formed of a flat metal bar, twisted at the junction, so as to be pivoted together by a rivet, $a$. The jaws are made tapering, and cut out from the points to, at, or near, the middle, so that when closed, they will overlap each other. On the back of each jaw is formed a rib, $b$, extending from the point nearly to the rivet, which materially strengthens the same, and prevents it from bending when in use. The end of the handle C forms a ring, $d$, while on the end of the other handle D is formed a socket, E.

To use this implement, a pole is inserted in the socket E, and a rope tied in the ring or eye $d$, which rope is to run through the eye $d'$, formed in the handle D, at the inner end of the socket.

The pole is to be loose in the socket, so as to be dropped when stock is caught, and the animal pulled in with the rope. The pole may be dispensed with in catching small stock.

This device may be used for catching hogs, calves, sheep, and other stock, and also for holding hogs while putting rings through their noses.

The stay-ribs $b\ b$ are designed to strengthen the jaws A B, and thus give the requisite strength to them without the necessity of making them so large as to be bungling, and clumsy to handle, as they would be if a cylindrical rod of iron, as is usually the case.

In the usual animal-catcher the jaws but just overlap each other, and form a circular opening to receive the leg of the animal; and this opening is always of the same size when the jaws overlap each other. Consequently it can be used only when the leg of the animal is of one size. If it is fitted to hold the leg of a large animal, an animal with a small leg would easily and quickly extricate himself from its gripe by slipping his leg through the opening. The rear legs of animals are not cylindrical but elliptical.

In my animal-catcher it will be seen that it adapts itself to just this shape of the leg, and hugs it close, whether it is a large or a small leg; hence, the chances of escape, when once caught, are far less in my animal-catcher than with others. The tapering points and stay-ribs unite lightness with strength.

Having thus fully described my invention, what I claim as new, and desire to secure by Letters Patent, is—

The jaws A B, provided with tapering points overlapping each other, and meeting at the shoulders $e\ e'$, and forming an elliptical opening for receiving the leg of the animal, the stay-ribs $b\ b$, the handle C with eye $d$, and handle D' with eye $d'$, and socket E, all substantially as described, and herein set forth.

In testimony that I claim the foregoing I have hereunto set my hand this 21st day of July, 1874.

WILLIAM R. AMES.

In presence of—
D. MACCURY,
A. WADDINGTON.